United States Patent [19]

Yamada et al.

[11] Patent Number: 4,596,527
[45] Date of Patent: Jun. 24, 1986

[54] ROLLER TUNNEL KILN

[75] Inventors: Hidehiko Yamada, Niibari; Takeshi Asano; Shuji Kimura, both of Tsuchiura; Yokichi Hashimoto; Koichi Fujitani, both of Ueno, all of Japan

[73] Assignee: Inax Corporation, Aichi, Japan

[21] Appl. No.: 679,009

[22] Filed: Dec. 6, 1984

[30] Foreign Application Priority Data

Jan. 13, 1984 [JP] Japan .................................. 59-5098
Feb. 20, 1984 [JP] Japan .................................. 59-31100
Oct. 9, 1984 [JP] Japan .................................. 59-212337

[51] Int. Cl.⁴ ........................ F27B 9/00; F27D 3/00; B65G 17/00
[52] U.S. Cl. ................................... 432/121; 198/779; 432/236; 432/246
[58] Field of Search .............. 432/121, 124, 246, 236; 198/779

[56] References Cited

U.S. PATENT DOCUMENTS 3,853,526 12/1974 Hochart ............................ 432/246
3,867,748 2/1975 Miller ................................ 198/780
3,934,970 1/1976 McMaster et al. ................. 432/121
4,034,837 7/1977 Vinarcsik et al. .................. 198/780
4,242,782 1/1981 Hanneken et al. ................. 432/246

*Primary Examiner*—John J. Camby
*Attorney, Agent, or Firm*—Wenderoth, Lind & Ponack

[57] ABSTRACT

A roller tunnel kiln includes a lower kiln body half composed integrally of a kiln bottom and a pair of transversely spaced lower kiln side wall halves which are made of refractory brick, a pair of endless chains disposed respectively on transversely opposite sides of the lower kiln body half outside thereof, the endless chains being movable forward along the lower kiln side wall halves at a height substantially equal to upper ends of the lower kiln side wall halves and movable backward along the lower kiln side wall halves at a height lower than the kiln bottom, a drive device for driving the endless chains in synchronism with each other, couplings mounted at regular intervals on link plates or link pins of each of the endless chains, feed members having opposite ends gripped by respective couplings and movable in a longitudinal direction of the lower kiln body half directly thereabove in response to the endless chains being synchronously driven, the feed members being made of a heat-resistant material and having a length larger than the width of the lower kiln body half, and a suspended upper kiln body half composed integrally of a kiln ceiling and a pair of transversely spaced upper kiln side wall halves which are made of refractory brick, the upper kiln body half being disposed with a clearance wide enough to allow the feed members to be moved therethrough being defined between lower end surfaces of the upper kiln side wall halves and upper end surfaces of the lower kiln side wall halves.

17 Claims, 18 Drawing Figures

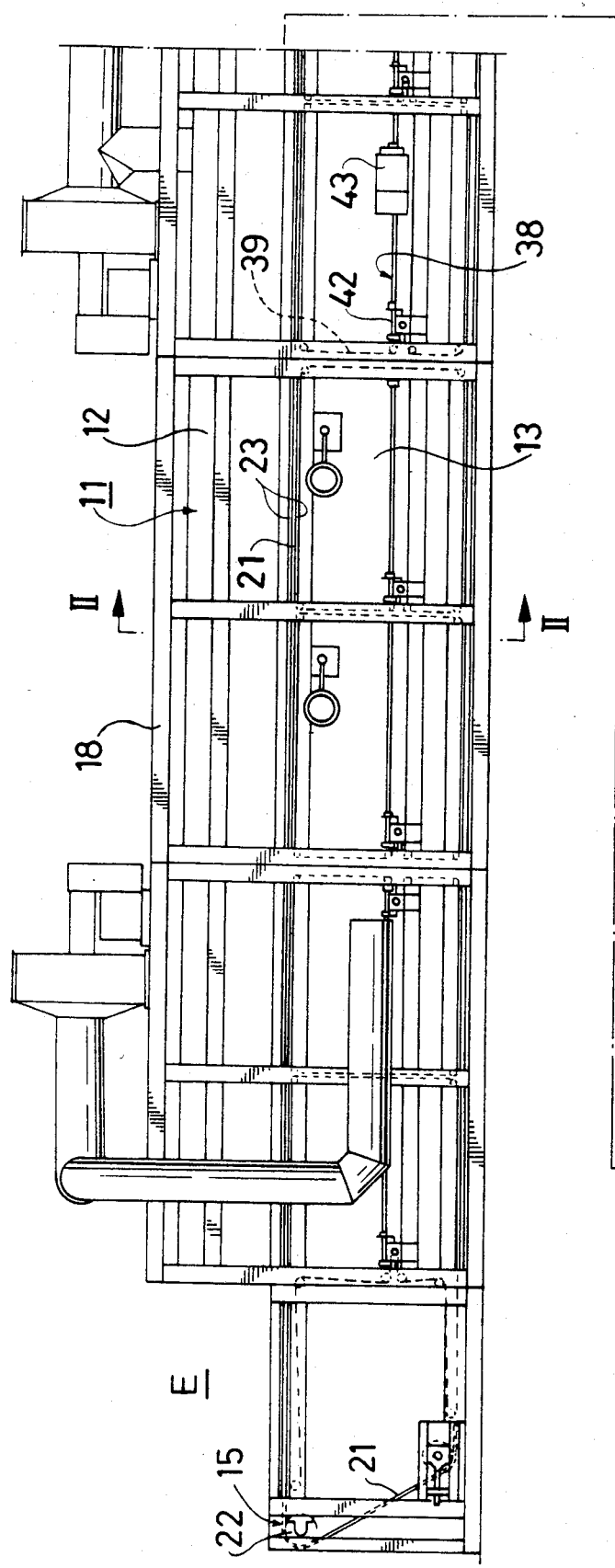
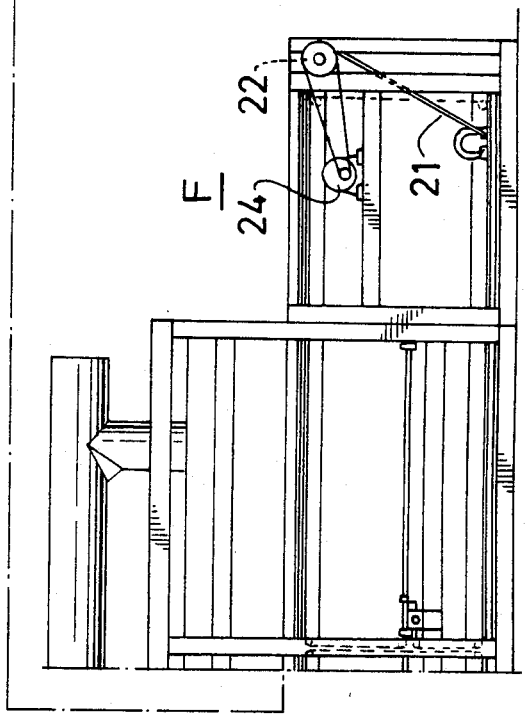
FIG. 1.

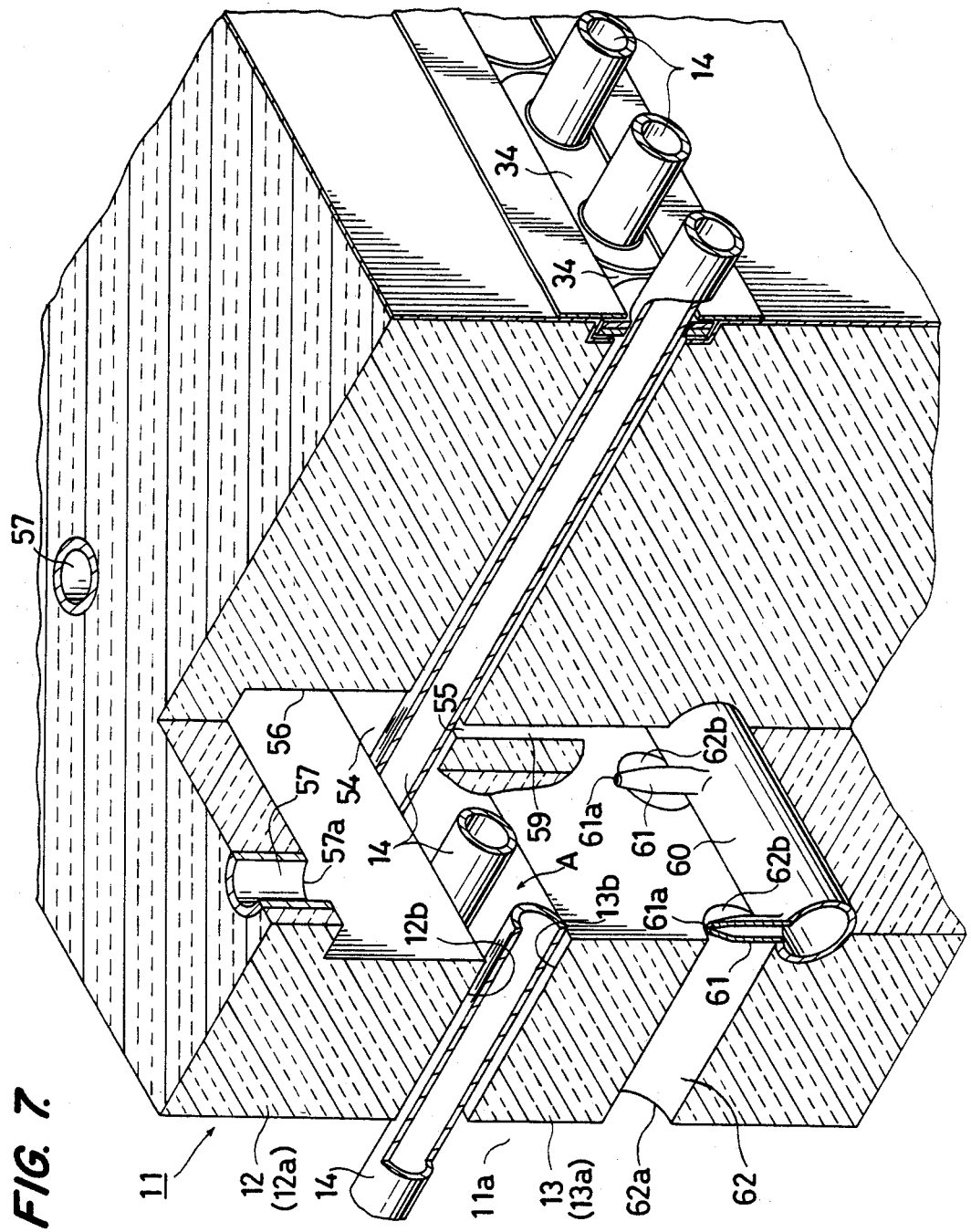

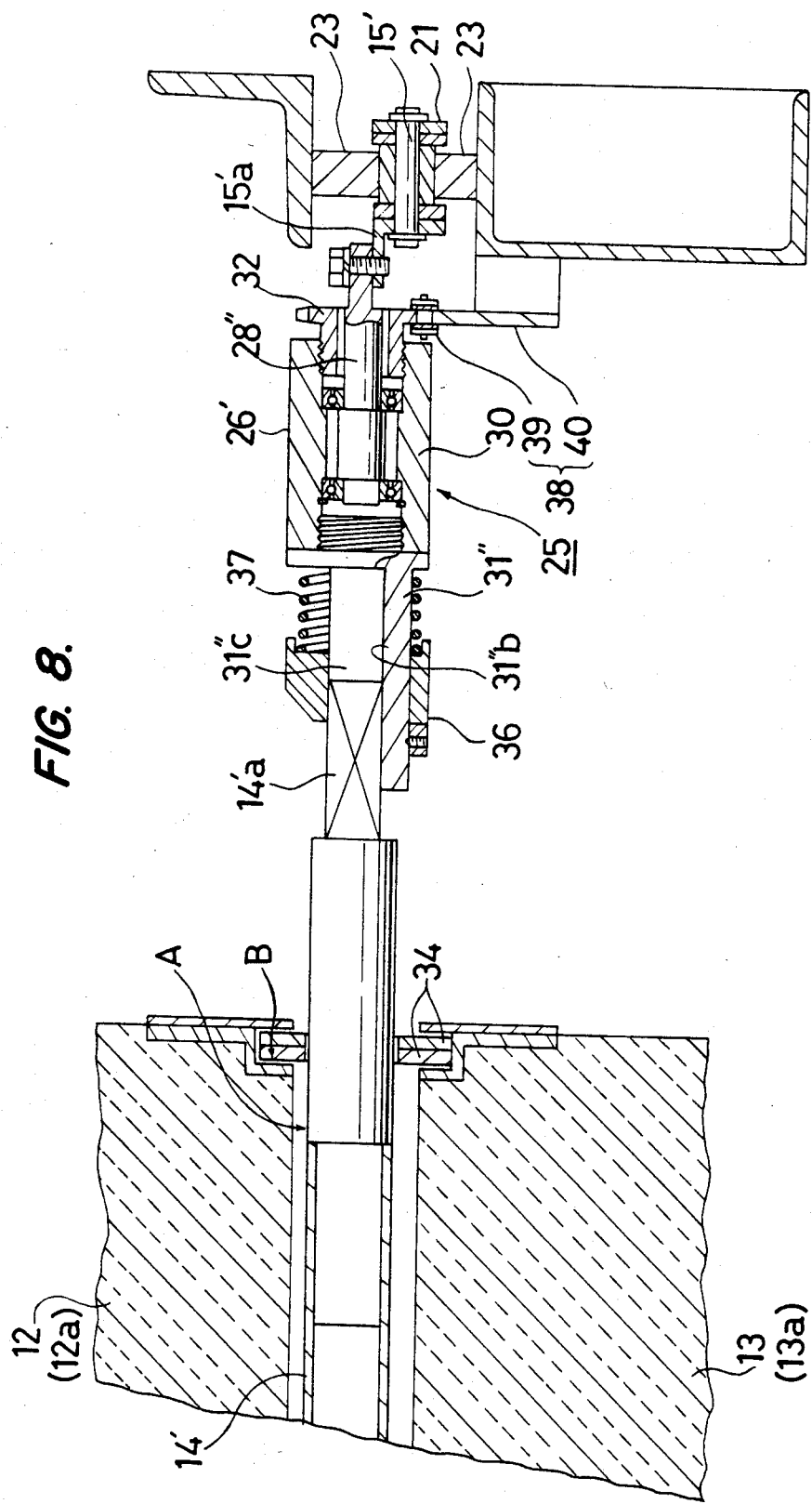

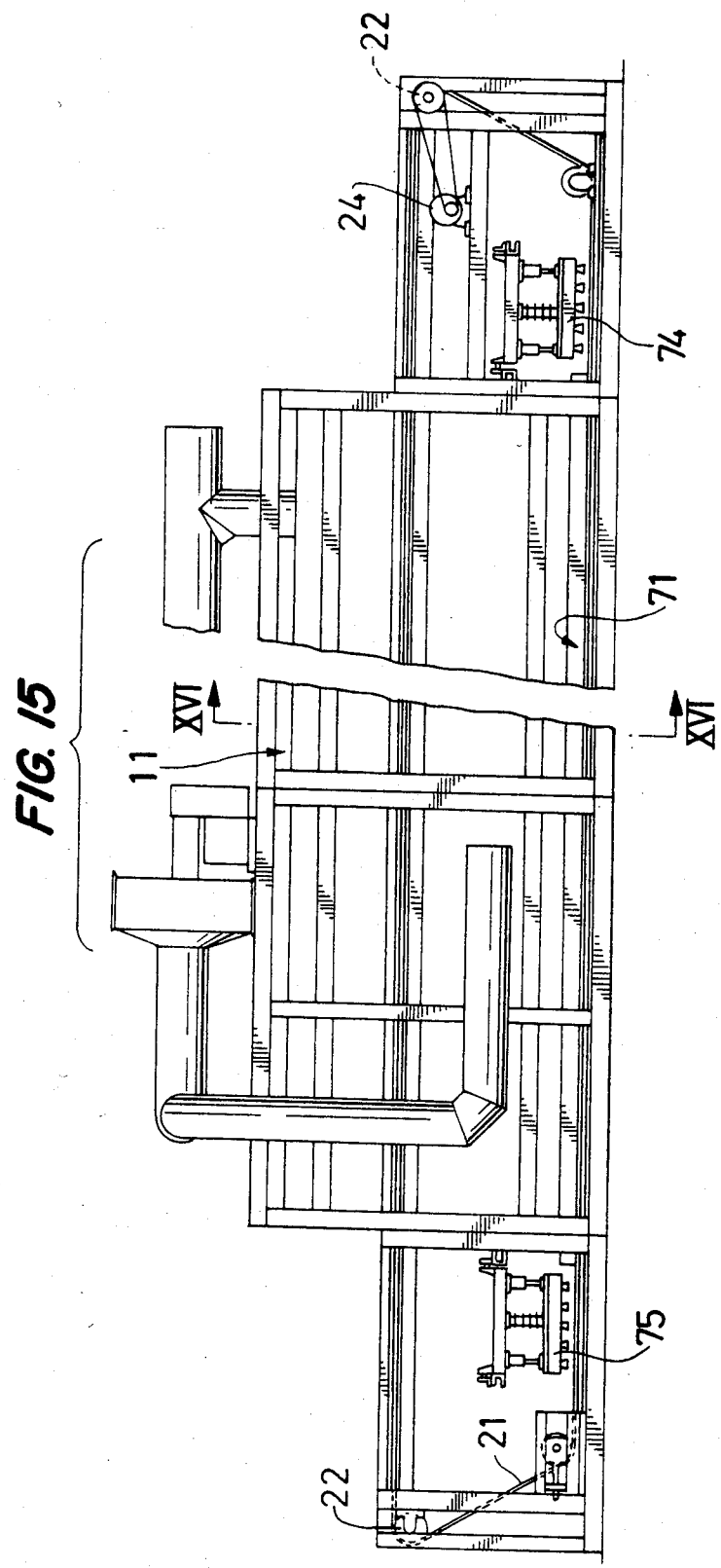

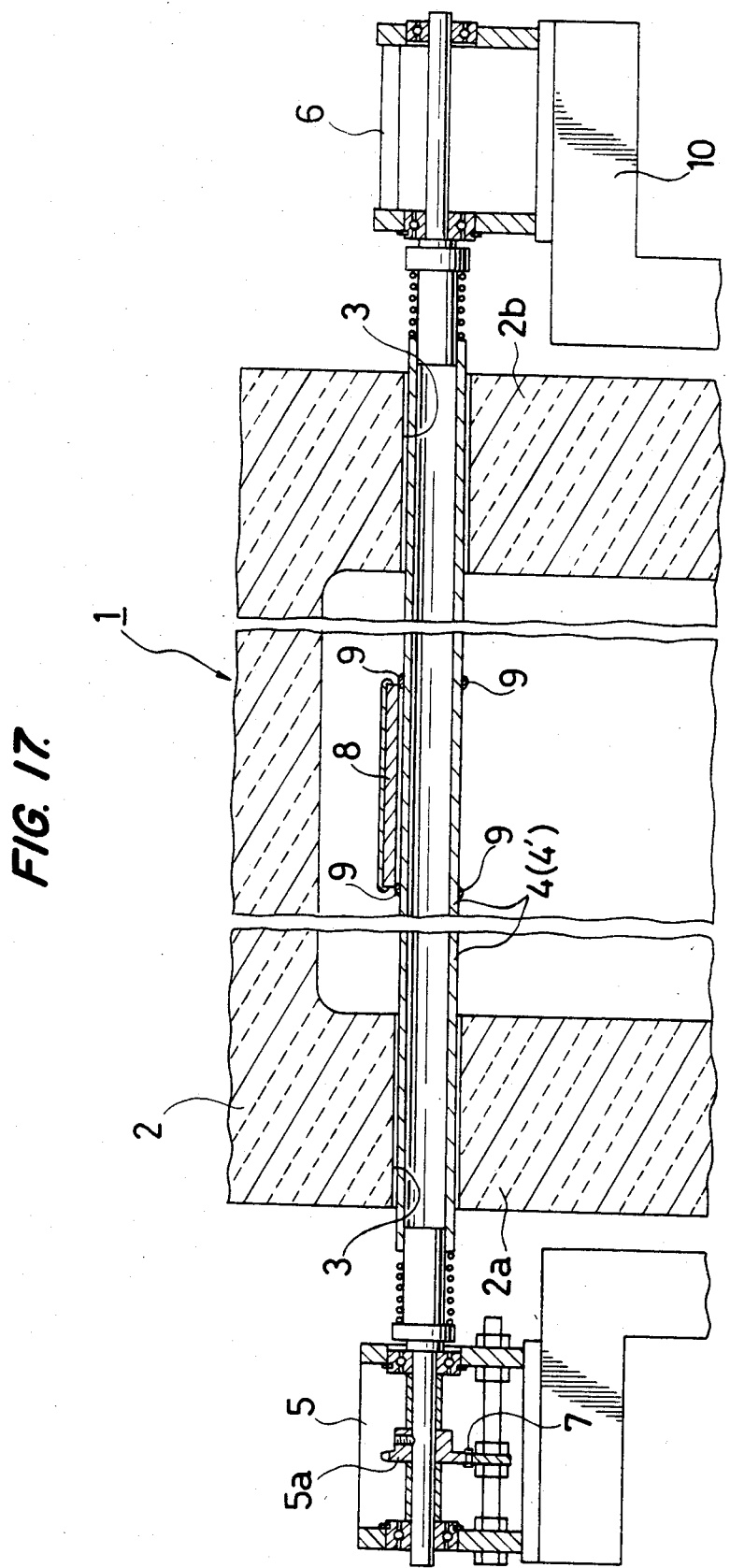

ROLLER TUNNEL KILN

BACKGROUND OF THE INVENTION

The present invention relates to a roller tunnel kiln for firing articles such as tile bases.

Conventional roller tunnel kilns have been composed of a tunnel-shaped or elongate tubular kiln body made of refractory brick, and a number of article feed rollers extending respectively through a number of holes defined at suitable intervals in opposite side walls of the kiln body, the article feed rollers being rotatable about their own axes but immovable longitudinally of the kiln body.

More specifically, as shown in FIG. 17 of the accompanying drawings, a conventional roller tunnel kiln 1 has porcelain feed rollers 4 extending respectively through a number of insertion holes 3 defined in opposite kiln walls 2a and 2b of a kiln body 2 and spaced at suitable intervals in the longitudinal direction of the kiln walls 2a and 2b. Each of the porcelain rollers 4 has opposite ends mounted on roller supports 5 and 6 disposed one on each side of the kiln body 2.

Roller supports 5 on one side have a number of chain sprockets 5a associated respectively with the rollers 4 in coaxial relation thereto, with a common drive chain 7 being in mesh with the chain sprockets 5a. By driving the drive chain 7, the chain sprockets 5a and hence all of the rollers 4 are rotated about their own axes at a prescribed rotational speed. An article 8 being fired which is placed on the porcelain rollers 4 are fed along successively over the rollers 4. Therefore, the article 8 can be fed along through the kiln.

However, the roller tunnel kiln 1 of the above construction has suffered the following disadvantages:

(1) A porcelain roller 4' with glaze deposits 9 on its surface has to be replaced with a new porcelain roller 4. However, the replacement process is tedious and time-consuming. First, the roller support 6 has to be detached from a bracket 10 in order to pull the roller 4' from the holes 3. Then, the new roller 4 is inserted through the holes 3 until its distal end is mounted on the roller support 5. The other end of the roller 4 is mounted on the roller support 6, which is then secured to the bracket 10. The above process is required for each roller. Therefore, large amount of labor and time is required for replacing porcelain rollers (usually 400 to 500 in number) disposed in a high-temperature firing zone in which the roller surfaces tend to be smeared with glaze deposits melted in a high-temperature atmosphere in the kiln.

(2) When removing the porcelain rollers 4' heated to 1100° to 1300° C. in the high-temperature firing zone in the tunnel kiln out of the holes 3, the rollers 4' are liable to get broken or cracked due to rapid quenching since there is a large temperature difference between the rollers and a temperature outside of the kiln. The same problem occurs when the new porcelain rollers 4 are placed into the high-temperature firing zone in the tunnel kiln since the rollers 4 are rapidly heated. In an actual roller replacement process, therefore, provision should be made for preventing the removed or inserted porcelain rollers from being damaged due to a thermal shock. However, the roller tunnel kiln cannot be put into operation if the temperature in the high-temperature zone falls below a prescribed temperature. With the conventional roller tunnel kiln, a long downtime has been necessary by each roller replacement process, and hence the availability of the kiln has been quite low.

(3) The porcelain roller 4 can easily be broken as it has a weak bending strength and a low shock resistance. Therefore, the porcelain rollers 4 have frequently been broken in the prior roller tunnel kiln. When a porcelain roller 4 is broken while the roller tunnel kiln is in operation, the roller 4 falls making a roller-free space in the succession of rollers. The article 8 having been delivered to the roller-free space, it is either stopped there and will not be advanced, or drops through the roller-free space onto the bottom of the kiln. The conventional practice is therefore that each time any porcelain roller in the kiln is broken, the operation of the roller tunnel kiln should be interrupted, and a new porcelain roller should be mounted in place. Therefore, the rate of production has been poor with the conventional kiln.

(4) The porcelain feed rollers in the roller tunnel kiln are rotated about their own axes for feeding along the article 8 successively thereover. Even if a row of aligned articles 8 is placed onto the feed rollers at the inlet of the tunnel kiln and successively fed into the kiln, the articles as they are fed are displaced out of alignment due to slippage between the surfaces of the rollers 4 and the lower surfaces of the articles 8. The articles 8 thus tend to hit each other and be broken, or a large expenditure of time and labor is required to deliver the articles in a row into an unloader (not shown) at the outlet of the roller tunnel kiln.

SUMMARY OF THE INVENTION

It is a first object of the present invention to provide a roller tunnel kiln in which feed means such as porcelain rollers can be replaced without having to lower the temperature in the kiln, especially in a high-temperature firing zone.

A second object of the present invention is to provide a roller tunnel kiln in which feed means such as porcelain rollers can be replaced simple and within a short period of time.

A third object of the present invention is to provide a roller tunnel kiln including feed means having a bending strength and a shock resistance much higher than those of porcelain rollers, and a sufficiently practical heat resistance.

A fourth object of the present invention is to provide a roller tunnel kiln in which articles being fired can be fed along in an aligned row without being displaced.

According to the present invention, there is provided a roller tunnel kiln comprising a lower kiln body half composed integrally of a kiln bottom and a pair of transversely spaced lower kiln side wall halves which are made of refractory brick, a pair of endless chains disposed respectively on transversely opposite sides of the lower kiln body half outside thereof, the endless chains being movable forward along the lower kiln side wall halves at a height substantially equal to upper ends of the lower kiln side wall halves and movable backward along the lower kiln side wall halves at a height lower than the kiln bottom, a drive device for driving the endless chains in synchronism with each other, chucking means mounted at regular intervals on link plates or link pins of each of the endless chains, feed means having opposite ends gripped by each of the chucking means and movable in a longitudinal direction of the lower kiln body half directly thereabove in response to the endless chains being synchronously driven, the feed means being made of a heat-resistant material and having a length larger than the width of the lower kiln body half, and a suspended upper kiln body half composed integrally of a kiln ceiling and a pair of transversely spaced upper kiln side wall halves which are made of refractory brick, the upper kiln body half being disposed with a clearance wide enough to allow the feed means to be moved therethrough being defined between lower end surfaces of the upper kiln side wall halves and upper end surfaces of the lower kiln side wall halves.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a fragmentary side elevational view, with an intermediate portion omitted from illustration, or a roller tunnel kiln according to the present invention;

FIG. 7 is a fragmentary perspective view, with parts cut away, of the kiln wall in the vicinity of a feed means passage A;

FIG. 8 is an enlarged fragmentary sectional front elevational view of a means for mounting a feed roller according to another embodiment;

FIG. 15 is a side elevational view, with an intermediate portion omitted from illustration, of a roller tunnel kiln having a drying chamber disposed below a kiln body;

FIG. 17 is an enlarged fragmentary sectional front elevational view, with an intermediate portion omitted from illustration, of a conventional roller tunnel kiln.

DETAILED DESCRIPTION OF THE PREFERRED EMBODIMENTS

The terms "front" and "rear" are used hereinafter to mean lefthand and righthand sides, respectively, in FIGS. 1, 4, 5, 10, 11, 13, and 15, and the terms "lefthand" and "righthand" are used hereinafter to mean lefthand and righthand sides, respectively, in FIGS. 2, 3, 6, 8, 9(A), 9(B), 12, 14, 16, and 17.

Figure 2:
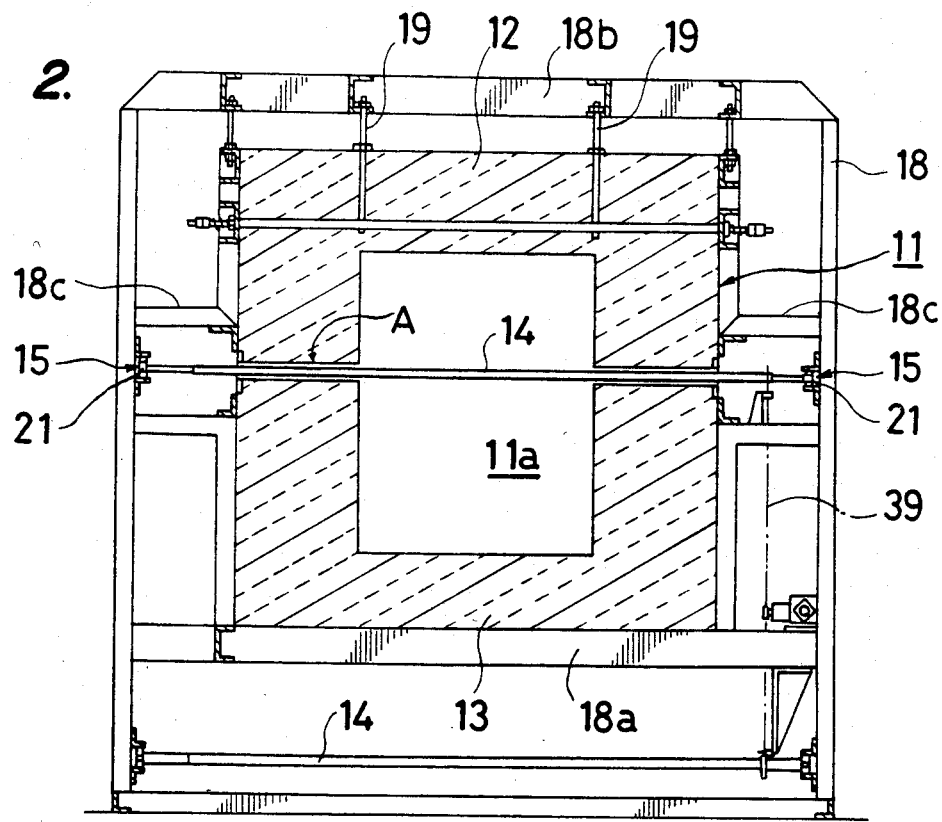
FIG. 2 is an enlarged cross-sectional view taken along line II—II of FIG. 1.

As illustrated in FIGS. 1 and 2, a roller tunnel kiln according to the present invention includes a kiln body 11 divided into several sections in a longitudinal direction in which articles to be fired are fed along. Each of the sections is composed of an upper kiln body half 12 of an integral construction comprising a ceiling and a pair of upper side wall halves made as of refractory brick, and a lower kiln body half 13 of an integral construction comprising a bottom and a pair of lower side wall halves made as of refractory brick. Between the upper and lower kiln body halves 12 and 13, there is defined a clearance (hereinafter referred to as a feed means passage A) having a vertical dimension large enough to allow feed means 14 such as porcelain rollers having a length larger than the width of the lower kiln body half 13 to be fed along in the direction in which articles to be fired are delivered.

Figure 6:
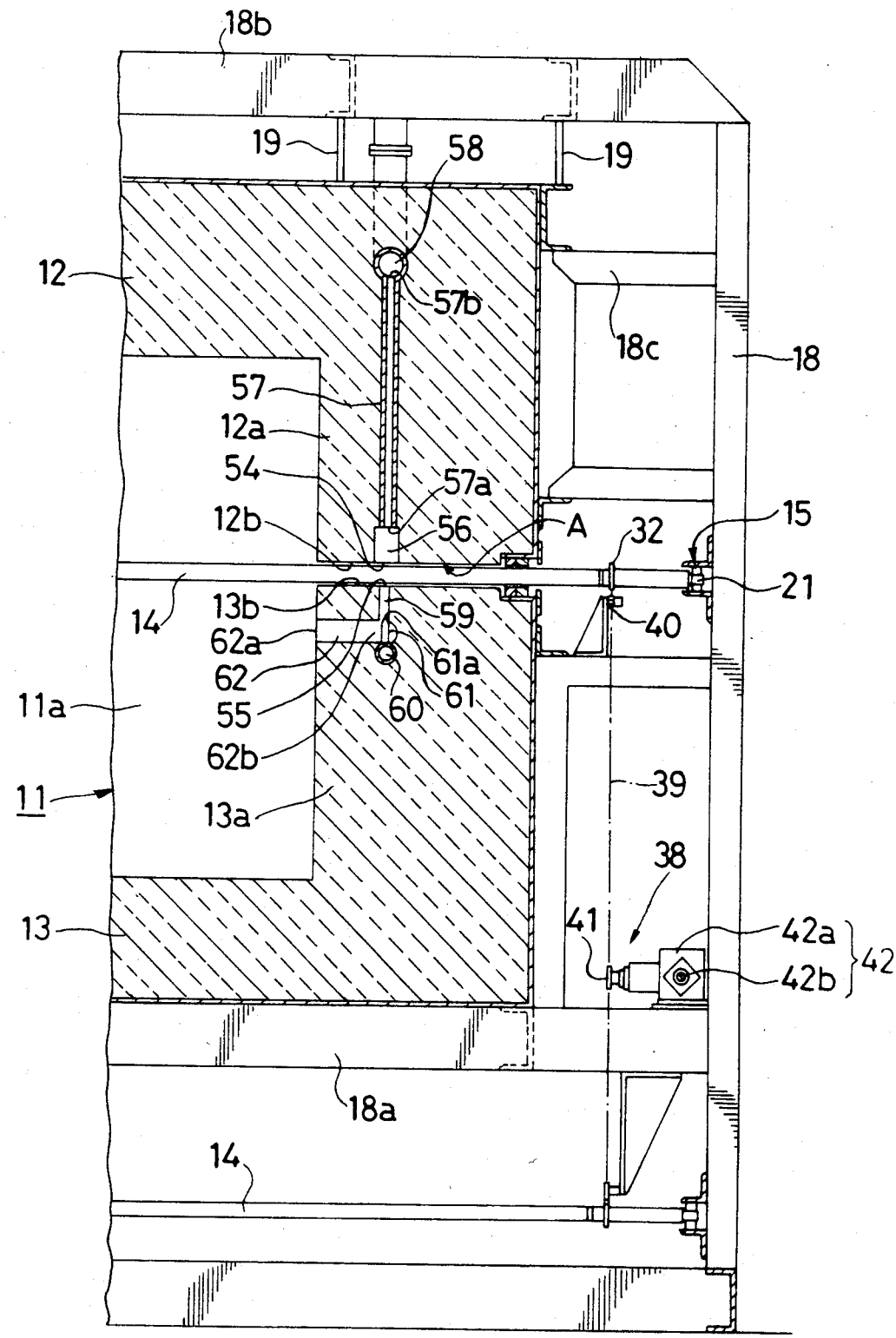
FIG. 6 is an enlarged fragmentary cross-sectional view of a wall of the tunnel kiln.

As shown in FIG. 6, the lower kiln body half 13 is mounted on a lower transverse beam 18a of a securely assembled frame 18. The upper kiln body half 12 is suspended by members 19 from an upper transverse beam 18b of the frame 18, the upper kiln body half 12 being vertically adjustable in height. The upper kiln body half 12 has opposite sides connected to brackets 18c of the frame 18 so as to be vertically adjustable in height.

Delivery means 15 are disposed laterally outside of the kiln body 11 and extend in the longitudinal direction thereof. Each of the delivery means 15 is composed of an endless chain 21, chain sprockets 22 around which the endless chain 21 is trained, a pair of upper and lower chain guide rails 23 mounted on the frame 18, and a chain drive motor 24 operatively coupled to one of the chain sprockets 22. The endless chains 21 on both sides are driven synchronously by the motor 24. When the endless chains 21 as they are driven are subjected to hunting, a drive motor or a brake (not shown) for braking the sprockets 22 disposed on an inlet end E of the roller tunnel kiln or a brake (not shown) is actuated to tension the chains 21 extending between the inlet end E and outlet end F, so that the endless chains 21 will be driven smoothly. Although each of the deliver means 15 has been shown as including the single endless chain 21 disposed outside of the kiln body 11, the present invention is not limited to the illustrated arrangement. Although not shown, the endless chain mounting area may be divided into a preheating zone, a firing zone, and a cooling zone, for example, in each of which an endless chain or endless chains may be provided.

Figure 4:
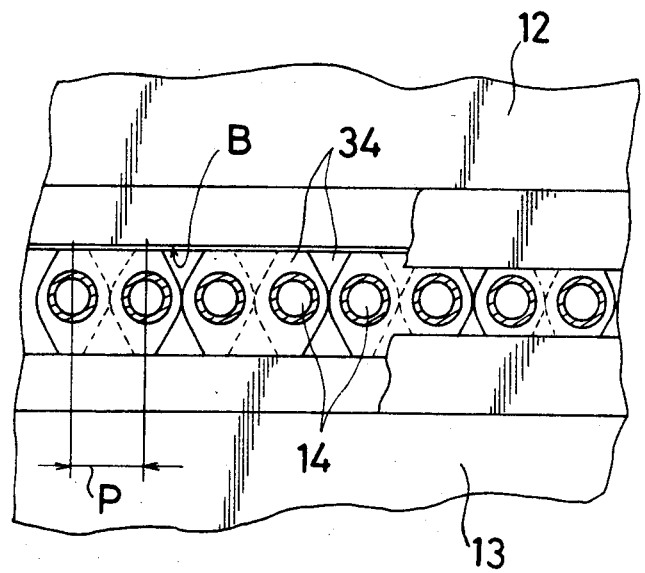
FIG. 4 is a cross-sectional view taken along line IV—IV of FIG. 3.
Figure 3:
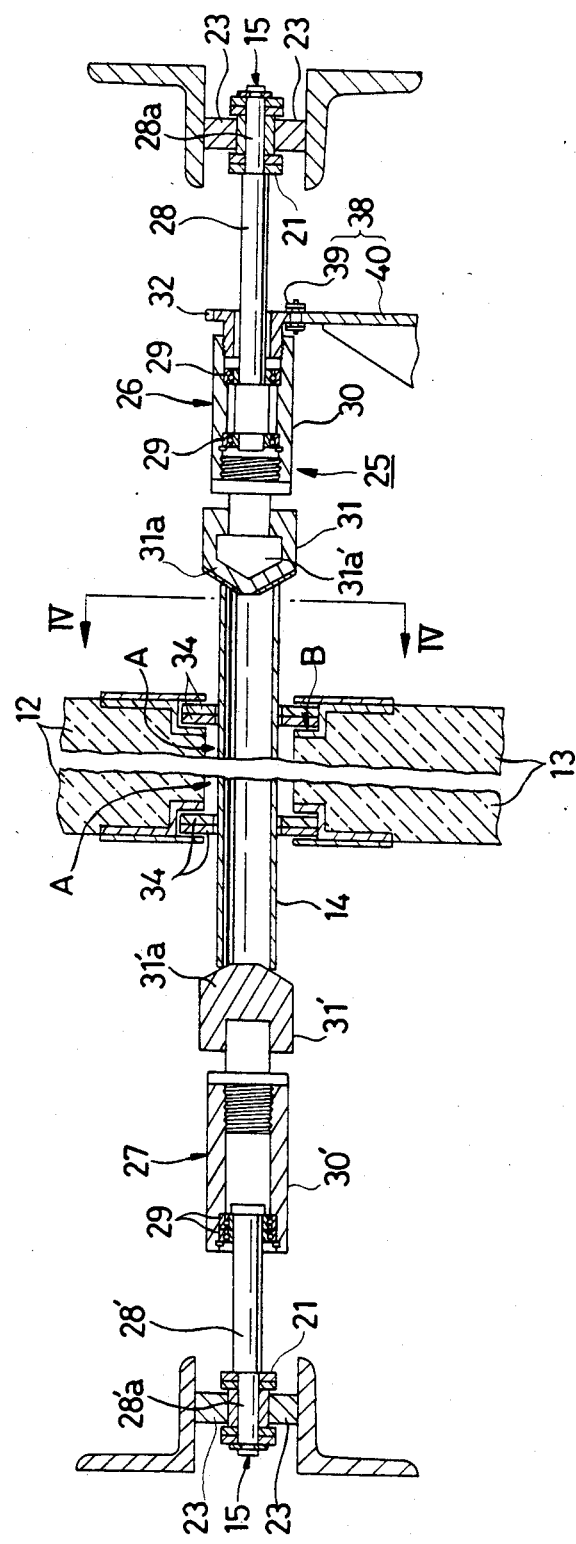
FIG. 3 is an enlarged fragmentary cross-sectional view, with an intermediate portion omitted from illustration, of a feed means as mounted in place.

As shown in FIG. 3, the delivery means 15 have a feed means support mechanism 25 including a plurality of pairs of couplings (chucking means) 26 and 27 spaced at suitable intervals P (see FIG. 4. P=25 through 50 mm, for example) in the longitudinal direction of the kiln body 11. The chucking means 26 (27) comprises a support shaft 28 (28') having an integral link pin 28a (28'a) of the endless chain 21, a rotatable sleeve 30 (30') mounted by bearings 29 on the support shaft 28 (28'), and a pressing holder 31 (31') threaded in the rotatable sleeve 30 (30'). The righthand chucking means 26 also includes a planet device 32 comprising a chain sprocket threaded in the rotatable sleeve 30. One or both of the pressing holders 31' includes a pressing head 31a (31'a) in the form of a resilient body made of heat-resistant rubber or comprising a coil spring. The resilient body is laterally expandable and contractable for allowing attachment and detachment of a porcelain feed roller 14, as described below. The pressing head 31a has a cavity 31a' defined therein for taking up longitudinal thermal expansion of the feed roller 14.

The feed means 14 comprise cylindrical porcelain rollers detachably mounted on each pair of chucking means 26 and 27 of the feed means support mechanism 25. As the delivery means 15 move on, the feed means 14 are moved through the feed means passage A extending in the longitudinal direction of the tunnel kiln. Seal plates 34 are fitted as required over two longitudinally adjacent feed rollers 14 closely to their ends for reducing the amount of ambient flowing into the kiln and preventing head radiation from leaking outwardly from the kiln through the feed means passage A. The seal plates 34 are moved with the feed rollers 14 through seal plate passages B (FIG. 4) defined in outer edged of the upper and lower kiln body halves 12 and 13.

Although the planet device 32 mounted on the rotatable sleeve 30 of the chucking means 26 (FIG. 3) has been described as comprising a chain sprocket, the planet device is not limited to the chain sprocket, but may comprise a suitable transmission member such as an external spur gear or a frictional roller, not shown. The planetary device 32 may alternatively not be mounted on the chucking means 26, but rather on the feed roller 14 (preferably near a supported end thereof).

Figure 5:
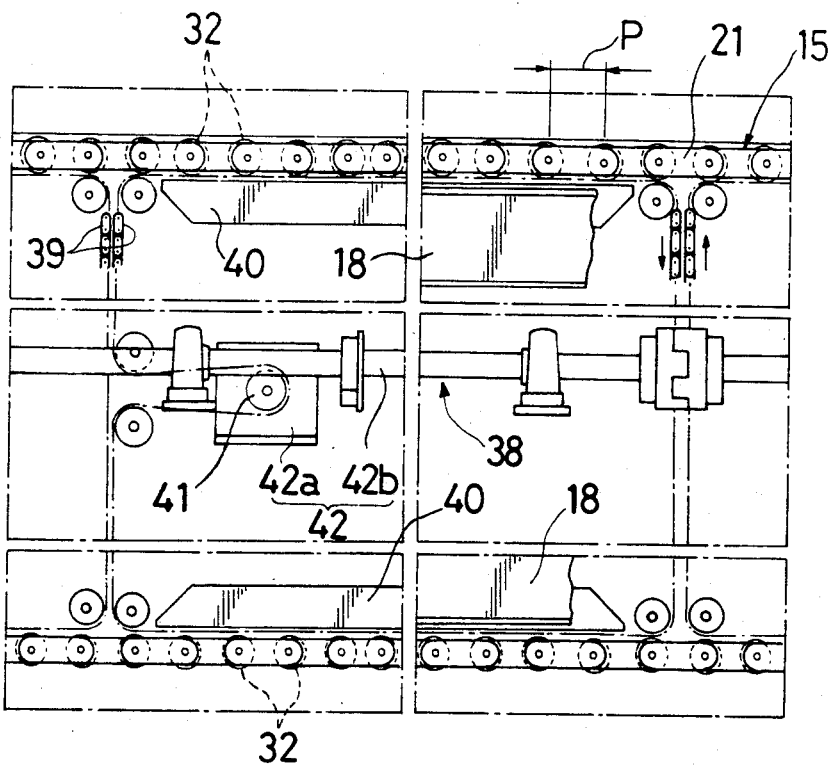
FIG. 5 is an enlarged fragmentary side elevational view, with an intermediate portion omitted from illustration, of a drive mechanism for rotating feed means about their own axes.
Figure 12:
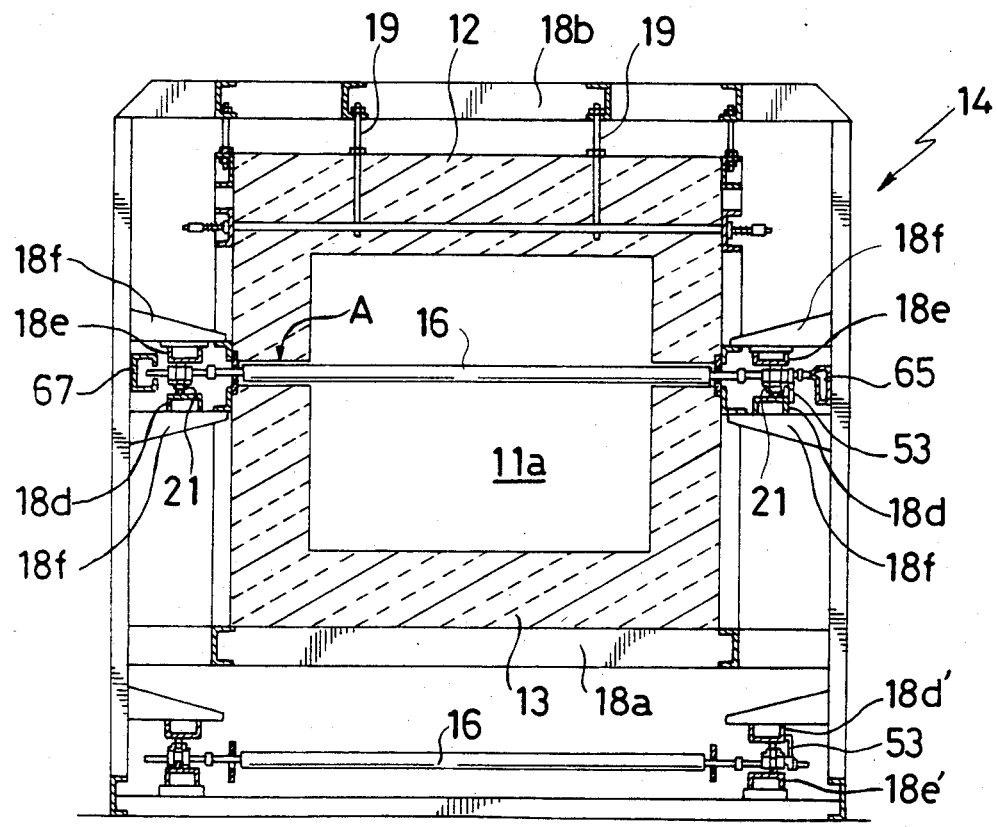
FIG. 12 is a sectional front elevational view of a feed means supporting mechanism different from that shown in FIG. 2.

As shown in FIGS. 1, 5, and 6, a sun device 38 for imposing rotative reactive forces to the planet devices 32 for rotating the feed rollers 14 on their own axes comprises a second endless chain 39 trained around the chain sprockets of the planet devices 32, guide rails 40 (FIGS. 3 and 5) attached to the frame 18 for guiding the second endless chain 39, a sprocket 41 around which the second endless chain 39 is trained, a transmission means 42 composed of a gear box 42a and a line shaft 42b for transmitting drive forces to the sprocket 41, and a drive source 43 (FIG. 1) comprising a variable-speed motor. The sun device 38 serves to drive the feed means 14 to rotate about their own axes at a desired rotational speed.

FIG. 8 is illustrative of a feed means support mechanism and a feed roller according to another embodiment. The arrangement of FIG. 8 differs from that shown in FIG. 3 in that a support shaft 28" of chucking means 26' is fixedly connected to an attachment 15' of delivery means 15', and engagement ring 36 is axially slidably fitted over a holder 31"b of a holder 31" composed of a cylinderial metal body having an axial recess 31"c, the engagement ring 36 being urged inwardly by a spring 37, and an end of a feed roller 14' can automatically be locked in place by allowing a journal 14'a of a polygonal cross section on the end of the feed roller 14' to fall downwardly into the recess 31"c in the holder 31"b.

A sun device 38 for applying rotational reactive forces to a planet device 32 mounted on a rotatable sleeve 30 of the chucking means 26' (FIG. 8) comprises an endless chain 39 meshing with the planet device 32 and fixed to a guide plate 40 in the longitudinal direction from the inlet end E to the outlet end F (FIG. 1), so that the feed roller 14' can be rotated about its own axis as the delivery means 15' is driven. Where the planet device 32 is composed of an external spur gear, the sun device 38 comprises a rack gear. Where the planet device 32 is composed of a frictional roller, the sun device 38 comprises a web-shaped frictional plate. In any case, the sun device 38 has a portion parallel to a full length or a portion of a circulating endless chain 21 which constituting the delivery means 15'. The endless chain 21, the planet device 32, and the sun device 38 constitute a differential rotational mechanism which operates on the same principle as that of a differential gear.

Figure 9A:
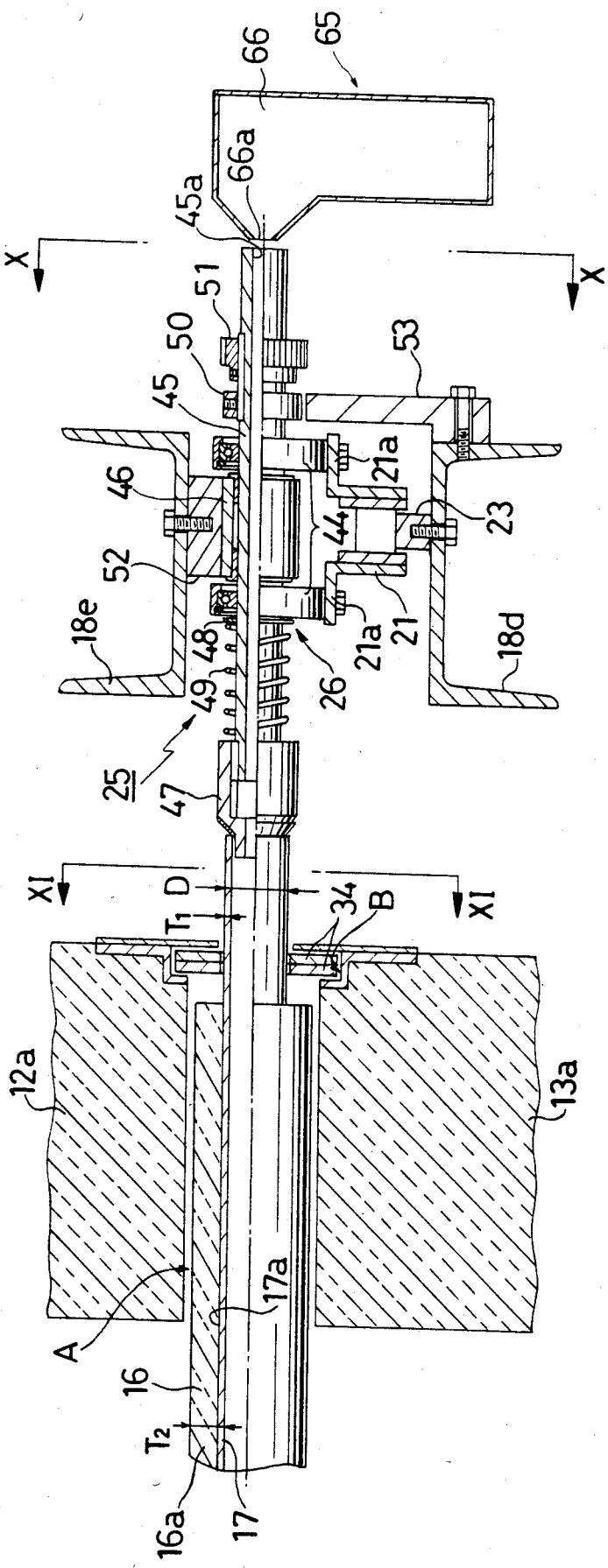
FIGS. 9(A) and 9(B) are enlarged fragmentary sectional front elevational views of a coated feed roller and a means for mounting the same.
Figure 9B:
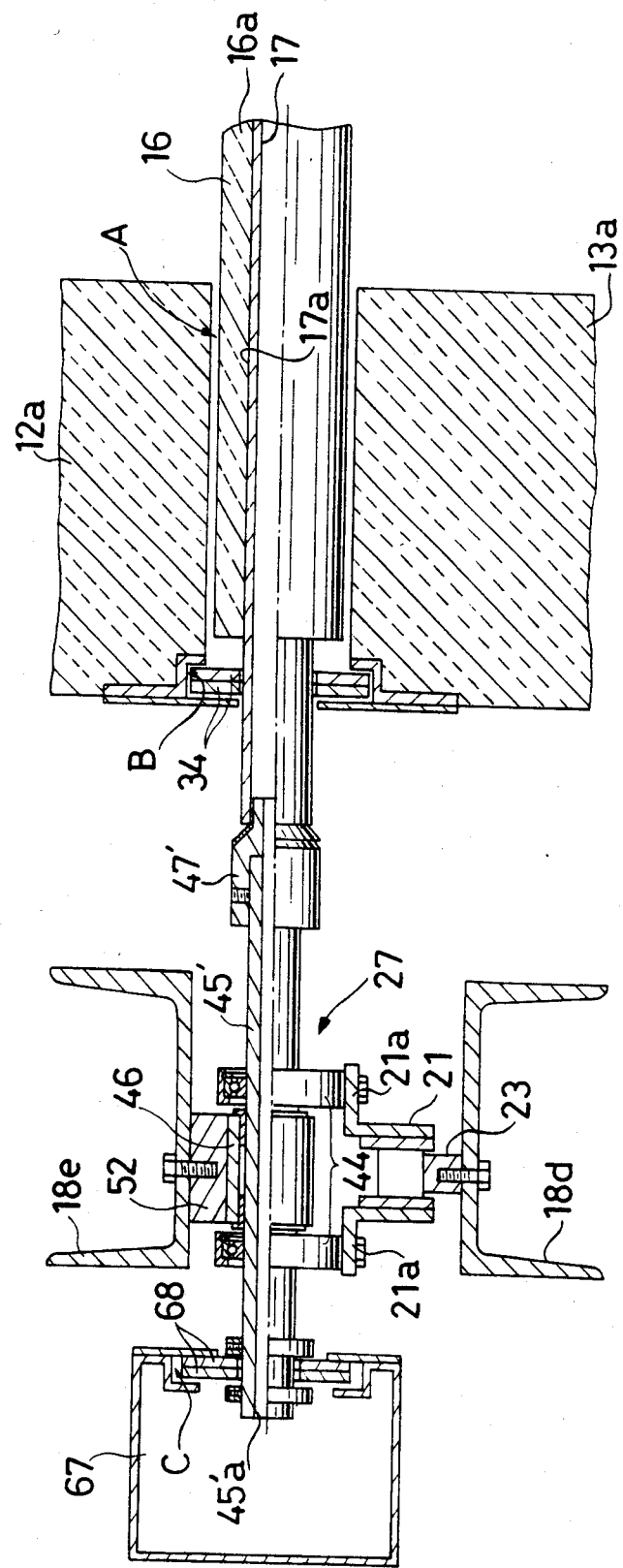
Figure 10:
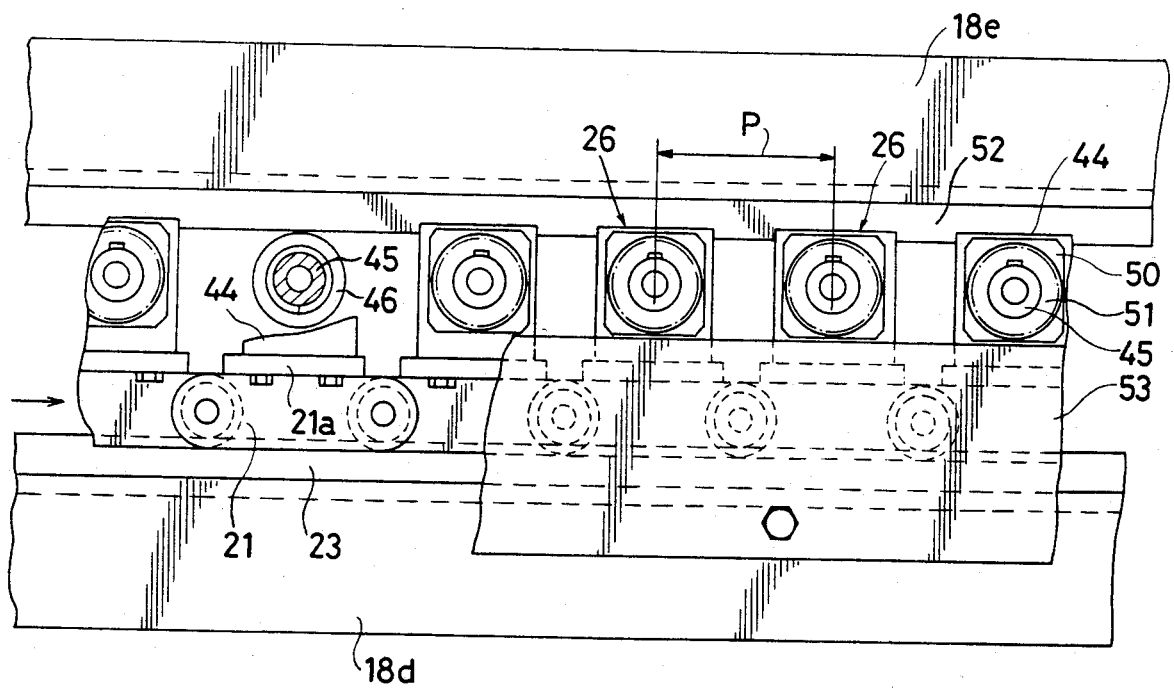
FIG. 10 is a side elevational view taken along line X—X of FIG. 9(A)

FIGS. 9 through 13 are illustrative of a feed means support mechanism according to still another embodiment of the invention. As shown in FIGS. 9(A) and 10, a feed means support mechanism includes righthand chucking means 26 each composed of bearings 44 mounted on link plates 21a of an endless chain 21, a hollow shaft 45 supported by the bearings 44, a guide roller 46 rotatably fitted over the hollow shaft 45 intermediate between the bearings 44, a chuck head 47 slidably fitted over a lefthand end of the hollow shaft 45, a compression coil spring 49 fitted over the hollow shaft 45 between a retaining ring 48 fitted over the hollow shaft 45 and the chuck head 47, and a rectangular cam plate 50 and a pinion 51 fitted over the hollow shaft 45 for preventing the same from rotating. The feed means support mechanism 25 also includes a lefthand chucking means 27 comprising, as shown in FIG. 9(B), bearings 44, a hollow shaft 45', a guide roller 46, and a chuck head 47' on a righthand end of the hollow shaft 45'. Roller guide rails 52 are mounted respectively on longitudinal beams 18e of the frame 18 parallel to the chain guide rails 23 for guiding the guide rollers 46 to keep the hollow shafts 45 and 45' of the chucking means 26 and 27 in a horizontal position. As illustrated in FIGS. 9(A), 10, 12, and 13, righthand longitudinal beams 18a and 18d' of the frame 18 support cam guide rails 53 for guiding upper and lower sides of the rectangular cam plate 50. The feed means support mechanism 25 thus constructed is effective in delivering cylindrical feed rollers 16 detachably mounted on each pair of chucking means 26 and 27 in the longitudinal direction of the roller tunnel kiln along a feed means passage A when the endless chains 21 are driven.

Figure 11:
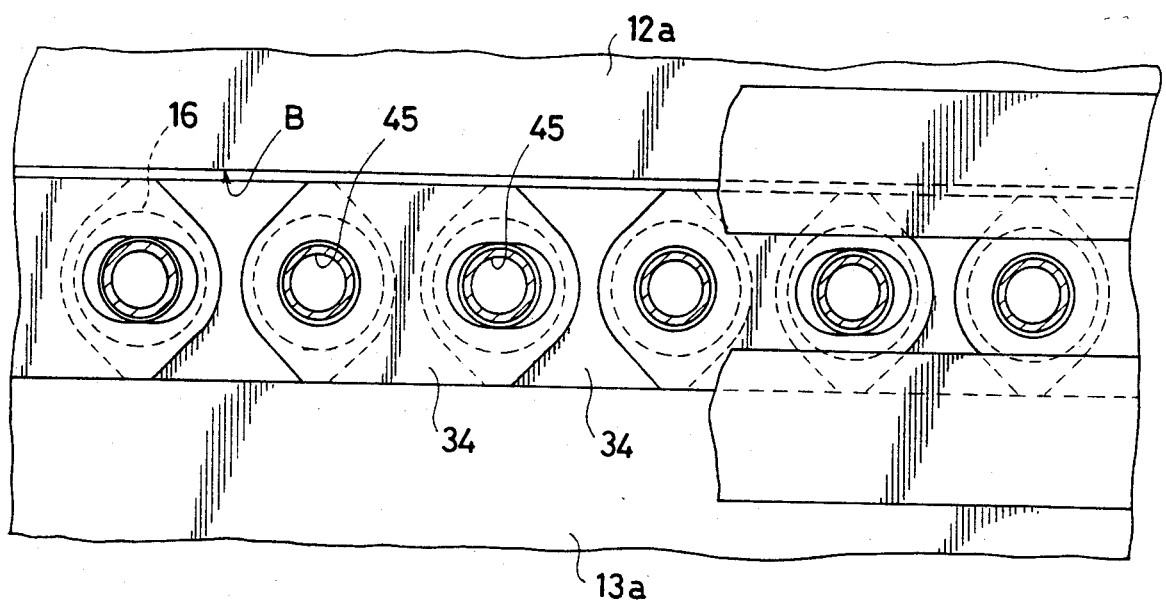
FIG. 11 is a cross-sectional view taken along line XI—XI of FIG. 9(A)

As shown in FIGS. 9(A), 9(B) and 11, a seal plate 34 is fitted as required over cores 17 exposed on righthand and lefthand ends of adjacent feed rollers 16 for preventing hot air from leaking from the kiln through the feed means passage A. The seal plates 34 are arranged to pass through seal plate passages B defined in outer edges of upper and lower kiln side wall halves 12a and 13a.

Each of the feed rollers 16 includes a fibrous layer 16a of silica and alumina covering an outer periphery 17a of the core 17 except its opposite ends, the core 17 being in the form of a heat-resistant steel pipe. The core 17 is made of Ni-Cr heat-resistant steel, and has an outside diameter D of about 25 mm and a wall thickness T1 ranging from 3 to 4 mm. The fibrous layer 16a is formed of entangled silica-alumina fibers each having a diameter ranging from 2 to 3 $\mu$m and a length ranging from 40 to 250 mm, and has a bulk density ranging from 60 to 200 kb/cm$^3$ and a thermal conductivity of about 0.18 Kcal/Mh°C. at 1,000° C., the fibrous layer 16a having a layer thickness T2 ranging from 10 to 15 mm. The fibrous layer 16a is mounted by fitting a tubular construction of silica-alumina fibers over the core 17.

As better shown in FIGS. 6 and 7, the roller tunnel kiln is assembled such that a lower surface 12b of each of the upper side wall halves 12a of the upper kiln body half 12 and an upper surface 13b of each of the lower side wall halves 13a of the lower kiln body half 13 are positioned as closely to each other as possible not to leave large clearances above and below the ends of the feed means 14 moving in the feed means passage A, and that one of the confronting end surfaces 12b and 13b (the end surface 12b in the illustrated embodiment) has a suction port 54 while the other end surface (13b in the illustrated embodiment) has a hot air outlet port 55. The hot air outlet port 55 is open in a position for directing hot air discharged therefrom toward the suction port 54. In the illustrated embodiment, the suction port 54 is composed of a recess 56 extending in the longitudinal direction in the lower end surface 12b of the upper kiln side wall half 12a, with lower ends 57a of inlet pipes 57 opening into the recess 56 at suitable pitches or intervals. The inlet pipes 57 have upper ends 57b (FIG. 6) connected to a common pipe 58 coupled to a suction port of a suction unit (not shown) located outside of the kiln body 11 and comprising a turbofan, for example. The recess 56 is employed for straightening an air flow to make uniform a suction vacuum on the lower surface 12b of the upper kiln side wall half 12a. Where the inlet pipes 57 are arranged at smaller pitches, the recess 56 may be dispensed with, and the lower ends 57a of the inlet pipes 57 may be directly open at the lower end surface 12b (see FIG. 14).

The hot air outlet port 55 is an upper opening of a slit-shaped hot air passage 59 directed toward the upper end surface 13b of the lower kiln side wall half 13a and extending in the longitudinal direction. A compressed-air supply pipe 60 lies in the bottom of the hot air passage 59, and nozzles 61 project from the compressed-air supply pipe 60 at suitable pitches into the hot air passage 59. Kiln gas inlet passages 62 having ends 62a opening into a kiln chamber 11a have opposite ends 62b opening into the hot air passage 59 in the vicinity of nozzle orifices 61a of the nozzles 61. When air is discharged at high speed from the nozzle orifices 61a, a high-temperature gas in the kiln chamber 11a is drawn under dynamic suction from the kiln gas inlet passages 62 and mixed with the air, and the mixture is discharged as a high-temperature air flow (at 400° C., for example) from the outlet port 55 of the slit-shaped hot air passage 59 toward the suction port 54. The high-temperature air flow from the hot air passage 59 forms an air curtain directly thereabove, dividing the feed means passage A into inner and outer sections. The slit-shaped hot air passage 59 is employed to disperse the high-temperature air in the longitudinal direction therein for forming a single air film extending from the upper end of the hot air passage 59 and in the longitudinal direction. However, the slit-shaped hot air passage 59 may be dispensed with where the pitches of the nozzles 61 and the pitches of the kiln gas inlet passages 62 are small. More specifically, the slit-shaped hot air passage 59 may be replaced with a column-shaped hot air discharge passage (not shown) defined in the lower kiln side wall half 13a and having an upper end opening at the upper end surface 13b of the lower kiln side wall half 13a, and the nozzle orifices 61a and the ends 62b of the kiln gas inlet passages 62 may open into the column-shaped hot air discharge passage in the vicinity of the bottom thereof.

In the embodiment shown in FIGS. 6 and 7, the suction port 54 opens at the lower end surface 12b of the upper kiln side wall half 12a, while the hot air outlet port 55 opens at the upper end surface 13b of the lower kiln side wall half 13a. However, the invention is not limited to such an arrangement. Although not shown, the suction port 54 may open at the upper end surface 13b of the lower kiln side wall half 13a, and the hot air outlet port 55 may open at the lower end surface 12b of the upper kiln side wall half 12a.

Figure 14:
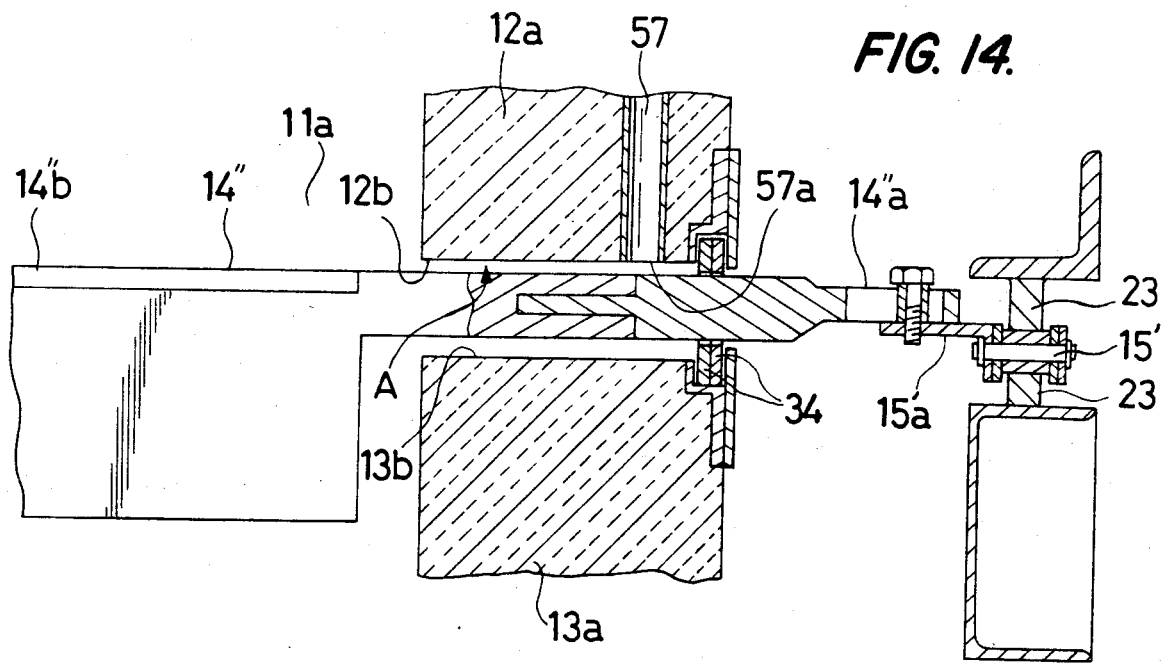
FIG. 14 is an enlarged fragmentary cross-sectional view of a roller tunnel kiln wall according to another embodiment.

FIG. 14 shows an another arrangement in which the suction ports 57a at the lower ends of the inlet pipes 57 open at the lower end surface 12b of the upper kiln side wall half 12a at suitable pitches in the longitudinal directions. The suction ports 57a should preferably be open more closely to an outer edge of the lower end surface 12b than to a central portion thereof. This is because the greater the distance between the suction ports 57a and the kiln interior 11a, the greater the resistance to the flow of hot air passing from the kiln through the feed means passage A, thus reducing the amount of hot air drawn from the kiln, and preventing any temperature difference between a body 14″b and an arm 14″a of feed means 14″ from becoming larger. Furthermore, a reduction in the distance between the suction ports 57a and the exterior side of the kiln allows a greater amount of ambient air to be drawn in through the suction ports 57a, thereby cooling the seal plates 34 fitted over the feed means 14 at the ends thereof to prevent the feed means 14 from being overheated. Although not shown, the other ends of the inlet pipes 57 are connected through a common pipe (see FIG. 6) or directly to an inlet port of a suction unit comprising a turbofan, for example.

The feed means 14″ shown in FIG. 14 is not cylindrical in shape, but has a body 14″b in the form of a depending plate of porcelain having a vertically cross-sectional shape of T or I. The feed means 14″ has its end 14″a detachably fixed to an attachment 15′a of delivery means 15′. Therefore, the feed means 14″ is not rotatable about its own axis unlike the feed means previously described.

The tunnel kiln of the present invention also has forcibly cooling means, indicated at 65 in FIGS. 9(A) and 9(B), for cooling the covered feed rollers 16 heated to a high temperature. The forcibly cooling means 65 comprises a cooling gas supply chamber 66 having an open nozzle 66a for ejecting a cooling gas toward axial end openings 45a of hollow shafts 45 constituting the right-hand chuck 26, and a suction chamber 67 for drawing a high-temperature gas from axial end openings 45′a of hollow shafts 45′ constituting the lefthand chuck 27. The suction chamber 67 has a second seal plate passage C for guiding seal plates 68 fitted therein near the axial ends of the adjacent hollow shafts 45′ so that no ambient air will be drawn into the suction chamber 67. The forcibly cooling means 65 is located in the firing zone in which the cores 17 of the covered feed rollers 16 are heated to a higher than allowable temperature.

Figure 13:
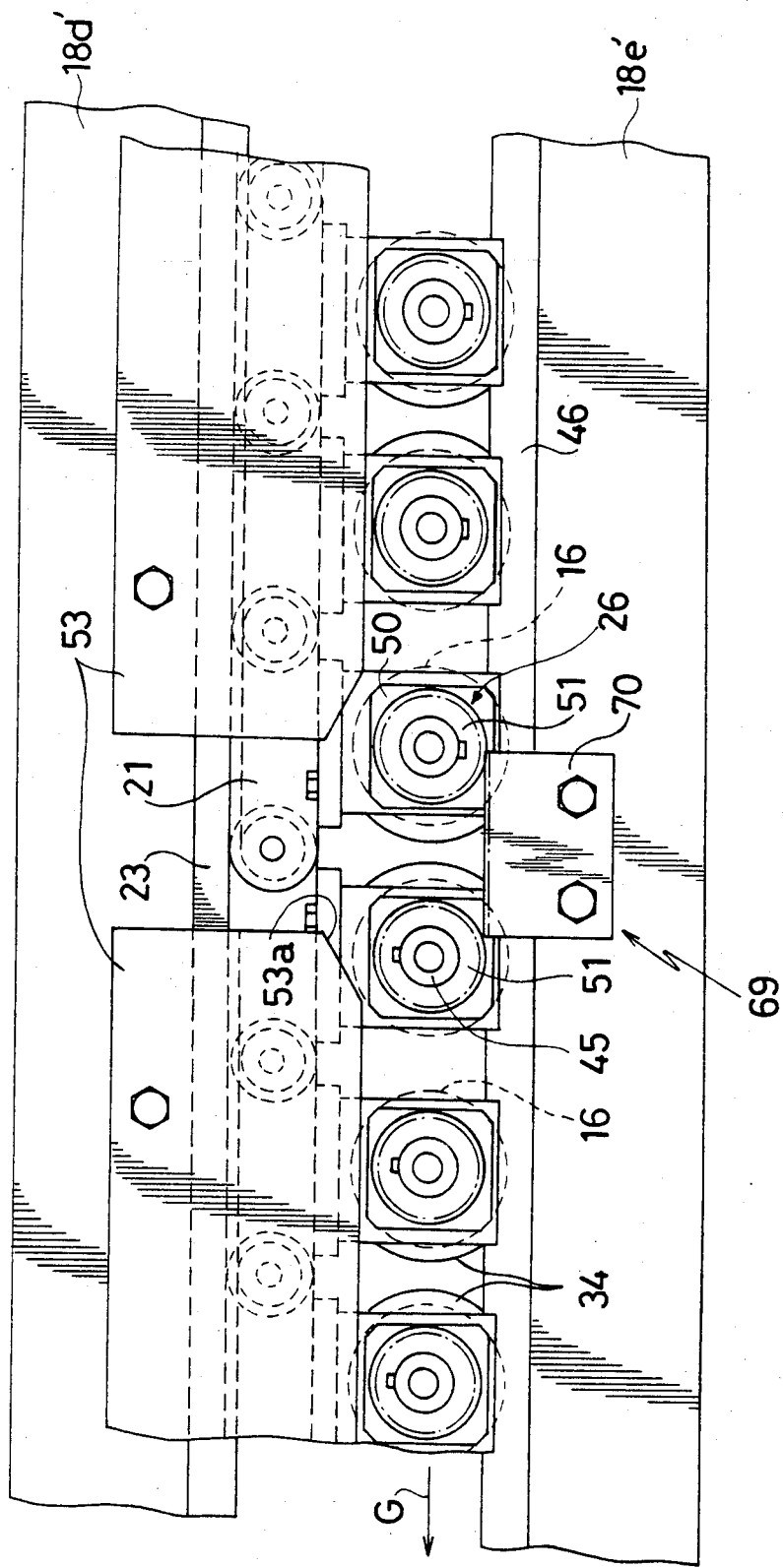
FIG. 13 is an enlarged fragmentary side elevational view of a mechanism for reversing a feed roller.

FIG. 13 shows in side elevation an inverter mechanism 69 for turning the covered feed roller 16 with its core 17 slightly curved by the heat from the firing zone, 180° upside down while the covered feed roller 16 is moving along a return path outside of the kiln after it has fed an article. The inverter mechanism 69 includes a rack 70 mounted on the longitudinal beam 18e′ and having an effective length required to rotate the pinion 51 of the chucking means 26 through 180°. Recesses 53a are defined in the cam guide rails 53 for allowing rotation of the cam plates 50. After an article has been fed, the pinion 51 moving in the direction of the arrow G below the kiln body is brought into mesh with the rack 70 as the endless chains 21 are driven, thus inverting the hollow shaft 45 through 180°.

Operation and advantages of the tunnel kiln according to the present invention will be described. As shown in FIG. 1, articles (not shown) such as tile bases placed on the feed means 14 (FIG. 2) at the inlet end E are fed along by the feed means 14 which are moved in the feeding direction as the endless chains 21 are driven. The articles are fired while they pass through the heated kiln 11a and are delivered to the outlet end F. Where glaze deposits or other deposits are put on surfaces of the feed means 14 and the articles cannot be smoothly fed along, the deliver means 15 composed of the endless chains are moved intermittently toward the inlet end E or the outlet end F, and the feed means 14 moved out of the kiln due to intermittent movement of the delivery means 15 are replaced with new ones while the delivery means 15 are at rest.

Because of the chucking means 26 and 27 (FIGS. 3, 9(A) and 9(B) which can simplify be operation, the feed means 14 can be replaced in a short period of time. It is important the delivery means 15 be intermittently fed at a safe speed lower than a speed at which the feed means 14 might be subjected to the danger of becoming broken due to rapid quenching or heating, since the temperature in the high-temperature firing zone is not lowered.

Figure 16:
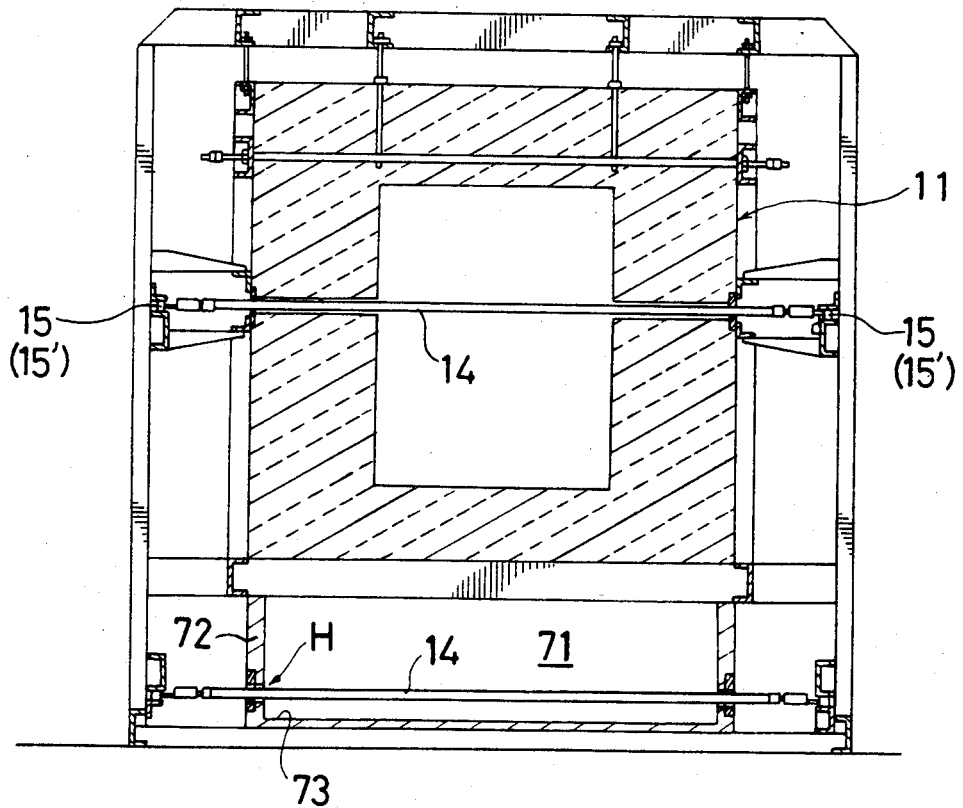
FIG. 16 is a cross-sectional view taken along line XVI—XVI of FIG. 15.

Since the feed means 14 after having fed the articles are brought out of the kiln and moved back below the kiln body 11 in a direction opposite to the feeding direction, any deposit or smear on the feed means 14 or conditions thereof can visually be observed while the feed means 14 are moved back. Therefore, it is possible to forecast when the feed means 14 are to be replaced.

Where no visual observation of the feed means 14 is necessary, a drying chamber 71 may be disposed below the kiln body 11 as illustrated in FIGS. 15 and 16. The drying chamber 71 is composed of upper and lower thermally insulating wall bodies 72 and 73 between which feed means return passages H are vertically sandwiched. In the drying chamber 71, the feed means 14 can be moved at a desired speed from a position below a loading device 74 which deposits the articles on the feed means 14 to a position below a discharging device 75 which picks up the dried articles. The interior of the drying chamber 71 is heated by an exhaust gas from the kiln body 11.

Where the covered feed rollers 16 as shown in FIGS. 9(A) and 9(B) are employed, the cores 17 are of a high bending strength and a high shock resistance since they comprise heat-resistant pipes, and hence the feed rollers 16 will not be broken under normal usage. Therefore, no articles will be dropped in the kiln while they are being fed along, and the production efficiency is increased to a large degree. In the event that the surfaces of the covered feed rollers 16 are smeared with glaze, the feed rollers 16 can be renewed simply by replacing the fibrous layer 16a which is inexpensive. Accordingly, the cost of replacement is lowered. The tunnel kiln of the invention employs so-called differential rotational mechanisms composed of the planet devices 32 and the sun device 38, so that the feed means 14 will be rotated about their own axes at a low peripheral speed, or the feed means 14" and 16 will not be rotated about their own axes at least during a feeding cycle. As a consequence, the articles can be fed along without being displaced out of a row, and can be discharged smoothly into an unloader at the outlet end of the tunnel kiln.

Although certain preferred embodiments have been shown and described, it should be understood that many changes and modifications may be made therein without departing from the scope of the appended claims.

What is claimed is:

1. A roller tunnel kiln comprising:
   (a) a lower kiln body half composed integrally of a kiln bottom and a pair of transversely spaced lower kiln side wall halves which are made of refractory brick;
   (b) a pair of endless chains disposed respectively on transversely opposite sides of said lower kiln body half outside thereof, said endless chains being movable forward along said lower kiln side wall halves at a height substantially equal to upper ends of said lower kiln side wall halves and movable backward along said lower kiln side wall halves at a height lower than said kiln bottom, said endless chains each having link members;
   (c) drive means for driving said endless chains in synchronism with each other;
   (d) couplings mounted at regular intervals on said link members of each of said endless chains;
   (e) feed means for feeding articles into said kiln, said feed means including feed members having opposite ends gripped by respective ones of said couplings and movable in a longitudinal direction of said lower kiln body half directly thereabove in response to said endless chains being synchronously driven, said feed members being made of a heat-resistant material and having a length larger than the width of said lower kiln body half; and
   (f) a suspended upper kiln body half composed integrally of a kiln ceiling and a pair of transversely spaced upper kiln side wall halves which are made of refractory brick, and means for suspending said upper kiln body half above said lower kiln body half with a clearance wide enough to allow said feed members to be moved therethrough being defined between lower end surfaces of said upper kiln side wall halves and upper end surfaces of said lower kiln side wall halves confronting said lower end surfaces, said upper and lower kiln side wall halves defining side walls of said kiln and together with said kiln ceiling and said kiln bottom enclosing a kiln interior, said side walls having inlet passages defined therein, said inlet passages having suction ports opening into said clearance through one of said upper end surfaces and said lower end surfaces; and
   a suction device connected to said inlet passages for drawing gases out of said kiln interior through said suction ports.

2. A roller tunnel kiln according to claim 1, wherein said feed means comprises a cylindrical porcelain feed roller.

3. A roller tunnel kiln according to claim 1, wherein said feed means comprises a covered feed roller composed of a core comprising a heat-resistant steel pipe, and a silica-alumina fibrous layer covering an outer periphery of said core.

4. A roller tunnel kiln according to claim 1, wherein said feed means comprises a porcelain depending plate having a vertical cross-sectional shape of T or I.

5. A roller tunnel kiln comprising:

(a) a lower kiln body half composed integrally of a kiln bottom and a pair of transversely spaced lower kiln side wall halves which are made of refractory brick;

(b) a pair of endless chains disposed respectively on transversely opposite sides of said lower kiln body half outside thereof, said endless chains being movable forward along the lower kiln side wall halves at a height substantially equal to upper ends of said lower kiln side wall halves and movable backward along said lower kiln side wall halves at a height lower than said kiln bottom, said endless chains each having link members;

(c) drive means for driving said endless chains in synchronism with each other;

(d) couplings mounted at regular intervals on said link members of each of said endless chains;

(e) feed means for feeding articles into said kiln, including feed members having opposite ends gripped by respective ones of said couplings and movable in a longitudinal direction of said lower kiln body half directly thereabove in response to said endless chains being synchronously driven, said feed members being made of heat-resistant material and having a length larger than the width of said lower kiln body half;

(f) a suspended upper kiln body half composed integrally of a kiln ceiling and a pair of transversely spaced upper kiln side wall halves which are made of refractory brick, and means for suspending said upper kiln body half above said lower kiln body half with a clearance wide enough to allow said feed members to be moved therethrough being defined between lower end surfaces of said upper kiln side wall halves and upper end surfaces of said lower kiln side wall halves confronting said upper end surfaces, said upper and lower kiln side wall halves defining side walls of said kiln, and together with said kiln ceiling and said kiln bottom, enclosing a kiln interior, said side walls having inlet passages and hot air passages defined therein, said inlet passages having suction ports opening into said clearance through one of said upper end surfaces and said lower end surfaces, said hot air passages having ends opening into said kiln interior, and outlet ports opening into said clearance through the other of said upper end surfaces and said lower end surfaces in positions for directing hot air from said outlet ports toward said suction ports; and a suction device connected to said inlet passages for drawing gases out of said kiln interior through said hot air passages and said inlet passages.

6. A tunnel kiln according to claim 5, wherein said feed means comprises cylindrical porcelain feed rollers.

7. A tunnel kiln according to claim 5, wherein said feed member comprises a covered feed roller, said covered feed roller comprising a core including a heat-resistant steel pipe, and a silica-alumina fibrous layer covering an outer periphery of said core.

8. A roller tunnel kiln according to claim 5, wherein each of said feed members comprises a porcelain depending plate.

9. A roller tunnel kiln comprising:

(a) a lower kiln body half composed integrally of a kiln bottom and a pair a transversely spaced lower kiln side wall halves which are made of refractory bricks;

(b) a pair of endless chains disposed respectively on transversely opposite sides of said lower kiln body half outside thereof, said endless chains being movable forwarded along said lower kiln side body halves at a height substantially equal to upper ends of said lower kiln side wall halves and movable backward along said lower kiln side wall halves at a height lower than said kiln bottom, said endless chains each having link members;

(c) drive means for driving said endless chains in synchronism with each other;

(d) couplings mounted at regular intervals on said link members of each of said endless chains;

(e) feed means for feeding articles into said kiln, said feed means including heat-resistant cylindrical porcelain feed rollers having opposite ends gripped by respective ones of said couplings and movable in a longitudinal direction of said lower kiln body half directly thereabove in response to said endless chains being synchronously driven, said rollers having a length larger than the width of said lower kiln body half; and (f) a suspended upper kiln body half composed integrally of a kiln ceiling and a pair of transversely spaced upper kiln side wall halves which are made of refractory brick, and means for suspending said upper kiln body half above said lower kiln body half with a clearance wide enough to allow said feed rollers to be moved therethrough being defined between lower end surfaces of said upper kiln side wall halves and upper end surfaces of said lower kiln side wall halves.

10. A roller tunnel kiln comprising:

(a) a lower kiln body half composed integrally of a kiln bottom and a pair of transversely spaced lower kiln side wall halves which are made of refractory bricks;

(b) a pair of endless chains disposed respectively on transversely opposite sides of said lower kiln body half outside thereof, said endless chains being movable forward along said lower kiln side wall halves at a height substantially equal to upper ends of said lower kiln side wall halves and movable backward along said lower kiln side wall halves at a height lower than said kiln bottom, said endless chains each having link members;

(c) drive means for driving said endless chains in synchronism with each other;

(d) couplings mounted at regular intervals on said link members of each of said endless chains;

(e) feed means for feeding articles into said kiln, said feed means including feed rollers having opposite ends gripped by respective ones of said couplings and movable in a longitudinal direction of said lower kiln body half directly thereabove in response to said endless chains being synchronously driven, said feed rollers each being made of heat-resistant material formed of a heat-resistant steel pipe and a silica-alumina fibrous layer covering an outer periphery of said pipe, and having a length larger than the width of said lower kiln body halves; and (f) a suspended upper kiln body half composed integrally of a kiln ceiling and a pair of transversely spaced upper kiln side walls halves which are made of refractory brick, and means for suspending said upper kiln body half above said lower kiln body half with a clearance wide enough to allow said feed rollers to be moved therethrough being defined between lower end surfaces of said upper kiln side wall halves and upper end surfaces of said lower kiln side wall halves.

11. A roller tunnel kiln comprising:

(a) a lower kiln body half composed integrally of a kiln bottom a pair of transversely spaced lower kiln side wall halves which are made of refractory brick;

(b) a pair of endless chains disposed respectively on transversely opposite sides of said lower kiln body half outside thereof, said endless chains being movable forward along said lower kiln side wall halves at a height substantially equal to upper ends of said lower kiln side wall halves and movable backward along said lower kiln side wall halves at a height lower than said kiln bottom, said endless chains each having link members;

(c) drive means for driving said endless chains in synchronism with each other;

(d) couplings mounted at regular intervals on said link members of each of said endless chains;

(e) feed means for feeding articles into said kiln, said feed means including feed members each including a heat-resistant porcelain depending plate having opposite ends gripped by respective ones of said couplings and movable in a longitudinal direction of said lower kiln body half directly thereabove in response to said endless chains being synchronously driven, said feed members being made of a heat-resistant material and having a length larger than the width of said lower kiln body half; and (f) a suspended upper kiln body half composed integrally of a kiln ceiling and a pair of transversely spaced upper kiln side wall halves which are made of refractory brick, and means for suspending said upper kiln body half above said lower kiln body half with a clearance wide enough to allow said feed members to be moved therethrough being defined between lower end surfaces of said upper kiln side wall halves and upper end surfaces of said lower kiln side wall halves.

12. A roller tunnel kiln as in claim 11, wherein said porcelain plate has a T-shaped vertical cross section.

13. A roller tunnel kiln as in claim 11, wherein said porcelain plate has an I-shaped vertical cross section.

14. A roller tunnel kiln as in claim 4 or claim 8, wherein said porcelain plate has a T-shaped vertical cross section.

15. A roller tunnel kiln as in claim 4 or claim 8, wherein said porcelain plate has an I-shaped vertical cross section.

16. A tunnel kiln according to claim 1, 3, 5, 6, 7, 8, 9, 10, or 11 wherein said couplings each have a planet device comprising a chain sprocket or a pinion which is integrally formed with the coupling, said coupling with said planet device being capable of differential operation while said planet device is held in mesh with a sun device composed of a second endless chain having a portion parallel to a full length or a portion of the circulating path of said endless chain, a rack, or a fixed chain, as said endless chain is moved.

17. A roller tunnel kiln according to claim 1, 3, 5, 6, 7, 8, 9, 10 or 11 wherein each of said couplings have therein an air passage communicating with the interior space in a or the cylindrical feed member as it is gripped by said coupling, said coupling being movable as said endless chains are moved while keeping an outer opening of said air passages in confronting relation to a gas supply port of a cooling gas supply device disposed outside of said upper and lower kiln side walls which constitute a firing zone of the roller tunnel kiln.

* * * * *